United States Patent
Doerner (10) Patent No.: US 10,877,893 B2
(45) Date of Patent: Dec. 29, 2020

(54) ADAPTIVE PRE-FETCH

(71) Applicant: Quantum Corporation, San Jose, CA (US)

(72) Inventor: Don Doerner, San Jose, CA (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 16/268,868

(22) Filed: Feb. 6, 2019

(65) Prior Publication Data

US 2019/0243766 A1    Aug. 8, 2019

Related U.S. Application Data (60) Provisional application No. 62/626,892, filed on Feb. 6, 2018.

(51) Int. Cl.
*G06F 12/0862*    (2016.01)

(52) U.S. Cl.
CPC .. *G06F 12/0862* (2013.01); *G06F 2212/1021* (2013.01); *G06F 2212/6024* (2013.01)

(58) Field of Classification Search
CPC ........ G06F 12/0862; G06F 2212/1021; G06F 2212/6024; G06F 3/0611; G06F 3/064; G06F 3/0679; G06F 2212/602–6028; G06F 11/1068; G06F 11/1072
See application file for complete search history.

(56) References Cited

U.S. PATENT DOCUMENTS

2019/0155750 A1 *  5/2019  Wang ................. G06F 12/0811

OTHER PUBLICATIONS

Ron C. Chiang, Ahsen J. Uppal, and H. Howie Huang, "An Adaptive IO Prefetching Approach for Virtualized Data Centers", IEEE Transactions on Services Computing, vol. 10, No. 3, May/Jun. 2017, Accessed from: https://ieeexplore.ieee.org/stamp/stamp.jsp?tp=&arnumber=7208857.*

* cited by examiner

*Primary Examiner* — Reginald G Bragdon
*Assistant Examiner* — Curtis James Kortman
(74) *Attorney, Agent, or Firm* — Eschweiler & Potashnik, LLC (57) ABSTRACT

Adaptive pre-fetching devices can predict data placement to improve the operating and/or electrical efficiency of a data storage system. A future input/output operation can be predicted from a current input/output operation, the state of the data storage apparatus, relationships between data currently being processed and data previously processed, or other factors. The apparatus and methods can improve data storage efficiency by selectively pre-fetching data, relocating data on the data storage apparatus, the backing storage, or within a plurality of data storage apparatus based on working set predictors to reduce cache misses or outperform fetch processes from the backing storage.

19 Claims, 6 Drawing Sheets

ADAPTIVE PRE-FETCH

REFERENCE TO RELATED APPLICATIONS

This application claims the benefit of U.S. Provisional Application No. 62/626,892 filed Feb. 6, 2018, entitled "ADAPTIVE PREFETCH", the contents of which are herein incorporated by reference in their entirety.

FIELD

The present disclosure relates to data system architectures and methods for configuring adaptive pre-fetching.

BACKGROUND

In today's computing environment, a large number of locations exists from which data can be stored or accessed, and thus a large number of locations from which data can be read. The different locations can have different properties (e.g., energy efficiency, cost, write time, read time, capacity, security). Even as the number and variety of locations available to store data has expanded, the paradigm for selecting the location for any particular piece of data can have lagged despite the efforts of programmers to optimize behavior. Thus, some inefficiencies in data storage and retrieval remain.

Caches are used to mitigate many computer performance-related problems. However, a universal shortcoming of all caches is response time on a cache miss. A cache miss can be defined as when requested data is not in the cache, and the requested data must be retrieved from underlying storage or backing storage. In the case of a cache miss, the cache cannot outperform the underlying backing storage that holds the data that is not in the cache, thus defeating the purpose of the cache.

An application can know what data it needs. The data an application needs can be stored on a block device. A block device can be, for example, a level of abstraction between a file system (FS) and underlying physical storage (e.g. tape drive, hard disk drive (HDD), solid state device (SSD)). Conventionally, however, an application does not know the relationship between the data that it needs and blocks stored on a block device or devices. A file system (FS) can understand the relationship between files and blocks stored on block devices. However, conventionally, a FS does not track working set relationships between files. Furthermore, while an application can organize related files in directories, conventional file systems do not treat files differently depending on what directory they are in.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (UE) (e.g., mobile/wireless phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

In consideration of described deficiencies of cache systems and operations various aspects/embodiments described herein enable mitigating the impact of cache misses by reducing the frequency of cache misses using adaptive prefetch. Embodiments described herein support a predefined size of block spaces of block devices (e.g., 4 KiB blocks, or other number of blocks) organized as a size/number of sequenced/indexed chunks (e.g., 4 MiB chunks. For example, cache lines can be chunk-sized, such as for cache line fetches (e.g., from backing storage to the cache), transfers (e.g., from cache to cache), or evictions (e.g., storage communications from cache to backing storage), which can be prosecuted in units of chunks. Example embodiments facilitate the provision of a fully-associative cache.

Embodiments described herein present as one or more block devices. A block device is based on the concept of a block space, which is an ordered collection of chunks. The block device can be a computer data storage device as a component that enables reading or writing in fixed-size blocks, sectors, clusters or chunks of memory (e.g., 4 Kibibytes (KiBs)) that can be organized into chunks (e.g., 4 MiBs). The block devices can be configured according to a block space, for example, and comprise a memory storage device or tangible computer readable medium as volatile or non-volatile memory, as well as, but not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

In one embodiment, a first chunk of a block device can contain blocks 0-1023, the second chunk contains blocks 1024-2047, and so on. In another embodiment, the backing storage for a block space can be an S3-based object store as a bucket for the block space and objects for the chunks.

Embodiments described herein define and manipulate working sets of data that can be associated with an end-user task or application of a user device. A working set of data can be a collection of data (e.g., files, database, tables, etc.) that can be utilized by an application (e.g., end-user program or processes that perform a set of functions, tasks or activities) for an end-user or user device (e.g., a mobile processing device, personal digital assistant (PDA), computing device, or the like) to carry out one or more end-user tasks.

An application can know what data it needs to operate accordingly or perform given end-user tasks, but not necessarily know the relationship between that is between this data and blocks stored on one or more block devices. File systems can understand the relationship between files and blocks on block devices, but not track working set relationships between files. Applications can organize related files in directories, but file systems do not usually treat files differently based on what directory they are in. Block devices do not offer optimizations around working sets of data, and thus file systems do not necessarily assume the existence of, or optimize around, any such concept; nor do conventional file systems or block devices offer any feature to applications to explicitly declare working sets.

Example embodiments improve on operations to block storage and working set data operation by providing components or mechanisms to declare a working set, facilitate the inference of a working set from previous device accesses, and prefetch the inferred working set into a cache in an adaptive manner for adaptive pre-fetching operations as predictions of the working set and working set predictors change.

Figure 1:
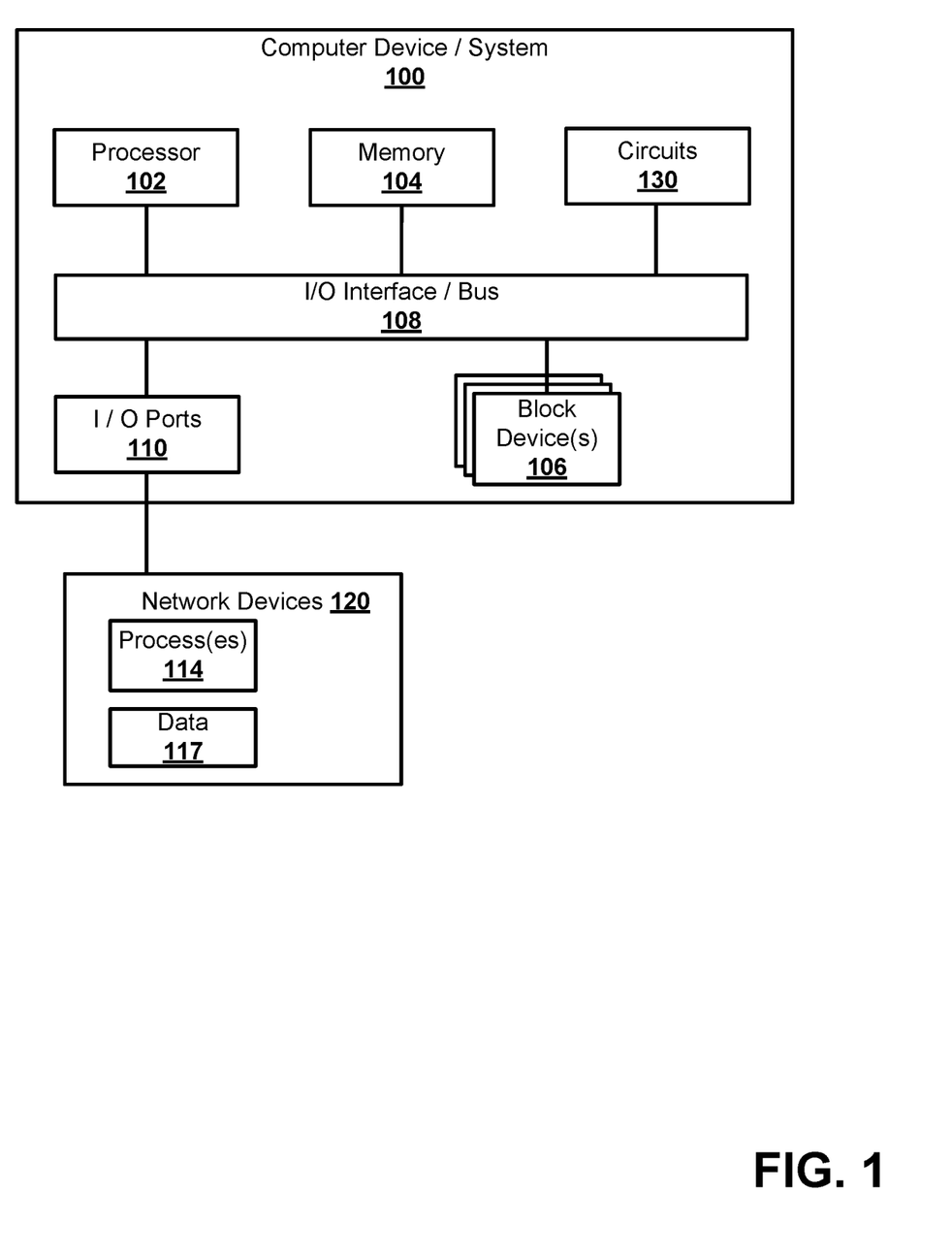
FIG. 1 is a block diagram illustrating an adaptive pre-fetching system or device according to various aspects (embodiments) described.

Additional aspects and details of the disclosure further described below with reference to figures FIG. 1 illustrates an example computing device or system that example operations, systems, apparatus, or methods described herein, and equivalents, can be processed or operate. The example computing device/system 100 can be a computer that includes a processor 102, a memory 104, block devices 106 and input/output ports 110 operably connected by an input/output (I/O) interface or an external/internal bus 108. The computer device 100 can include communication or processing circuitry as circuit(s) 130 configured to facilitate providing data or processing working sets of application data to adaptively fetch and provide for execution of end-user tasks or application requests for resources.

In different examples, circuit 130 can be implemented in hardware, software, firmware, or combinations thereof. While circuit 130 is illustrated as a hardware component attached to the bus 108, it is to be appreciated that in one example, circuit 130 could be implemented in the processor 102, such as a system on a chip (SoC), single integrated chip, microcontroller or the like. In an example configuration of the computer 100, the processor 102 can be a variety of various processors including dual microprocessor and other multi-processor architectures. A memory 104 can include volatile memory and/or non-volatile memory. Non-volatile memory can include, for example, ROM, PROM, or other memory. Volatile memory can include, for example, RAM, SRAM, DRAM, or other memory.

One or more block devices 106 can be operably connected to the computer device 100 via, for example, an input/output interface (e.g., card, device) 118 and an input/output port 110. The block devices 106 can be, for example, a magnetic disk drive, a solid state disk drive, a floppy disk drive, a tape drive, a Zip drive, a flash memory card, a memory stick, or other device. Furthermore, the block devices 106 can be a CD-ROM drive, a CD-R drive, a CD-RW drive, a DVD ROM drive, a Blu-Ray drive, an HD-DVD drive, or other storage/processing device. The memory 104 can store a process 114 or data 116, for example. The block devices 106 or the memory 104 can store an operating system that controls or allocates resources of the computer 100, or data for processing an operating system or other application in part or whole.

The I/O interface/bus 108 can be a single internal bus interconnect architecture and/or other bus or mesh architectures. While a single bus is illustrated, it is to be appreciated that the computer 100 can communicate with various devices, logics, and peripherals using other busses (e.g., PCIE, 1394, USB, Ethernet). The bus 108 can be types including, for example, a memory bus, a memory controller, a peripheral bus, an external bus, a crossbar switch, a local bus, or external/internal interface.

The computer 100 can interact with input/output devices via the I/O interfaces 118 and the input/output ports 110. Input/output devices can be, for example, a keyboard, a microphone, a pointing and selection device, cameras, video cards, displays, the block devices 106, the network devices 120, and other devices. The input/output ports 110 can include, for example, serial ports, parallel ports, and USB ports.

The computer 100 can operate in a network environment and thus can be connected to the network/user devices 120 via the I/O interfaces 118, and/or the I/O ports 110. Through the network devices 120, the computer 100 can interact with a network. Through the network, the computer 100 can be logically connected to remote computers. Networks with which the computer 100 can interact include, but are not limited to, a LAN, a WAN, and other networks.

In an aspect, the one or more block devices 106 enable or offer optimizations around working sets of data, and to independently and adaptively declare working sets (e.g., working sets of application data, or end-user task data for an application). The block devices 106 can be configured based on a block space, which is an ordered collection of chunks, where each chunk can be have a chunk number and be ordered or configured in the block devices 106 based on a sequence of chunk numbers, for example, where clusters or chunks of memory (e.g., 4 Kibibytes (KiBs)) can be organized into chunks (e.g., 4 MiBs) based on one or more criteria (e.g., proximity, use, response time, or the like) in a dynamic fashion or adaptively. For example, a first chunk of a block device 106 can contain blocks 0-1023, a second chunk contain blocks 1024-2047, and so on, wherein any one or more block devise comprises one or more blocks of chunks.

In another embodiment, the block devices 106 can be configured to declare or form working sets in order to enable adaptive pre-fetching of data based on I/O operation(s), end-user task request(s), application data being processed that corresponds to an application or set of processes for a task of a network/user device 120 or of an operating system or operation of the computer device/system 100 (e.g., via processor 102, or the like). The block devices 106 therefore can operate in a communicatively coupling with the computer device/system 100 or integrated thereon to adaptively declare working sets for use explicitly by particular sets of operations/processes 114/application data 117.

Adaptive prefetch includes capturing new working set information, and using already-captured working set information to reduce cache misses. At the level of the block device, a user or user device can have very little information. It can be unknown, at the level of the block device, how many applications or application workloads can be running concurrently, for example. It can be unknown how fast end-users are working, for example. Relationships between blocks and files can be unknown, and relationships between files and applications or application workloads can also be unknown. Because the block devices 106 can be configured for adaptive prefetch to capture working set predictors and declare working sets dynamically and adaptively, such issues or problems can be overcome.

In another aspect, the memory 104 or other component (e.g., one or more block devices 106) can store data (e.g., metadata or the like) that is associated with a working set being processed by the processor for the one or more block devices or via I/O interface bus 108 associated with I/O operation inputs of the I/O ports 110 or processes interfacing with the computer 100 via process(es) 114 and application 117 of the network/user device(s) 120. The metadata or data, for example, can comprise one or more of: an access pattern, a usage trend, a relationship, or a prediction, related to the first working set being processed by the apparatus based on input/output (I/O) operations of an end-user task. The data or metadata can be one or more of the following: a file, object, record, table byte-stream, a physical storage block/chunk of the block or associated index/sequence chunk numbers, or other characteristics of data being accessed, read or written to, for or during I/O operations.

The one or more block devices 106 can be configured, thus, to process an I/O request for I/O operations related to a working set being processed. The block device(s) 106 can further update the metadata or the working set based on observed I/O behavior with the one or more block devices. For example, I/O behavior can be any particular datum or metadatum associated with the end-user task or application making I/O requests (e.g., as read, write or processing requests) with resources of the computer 100. This data or working set can further comprise different locations of data in the memory 104 or the block devices 106 for fetching or pre-fetching in a cache, reducing cache misses or increasing a response time to a pre-fetch time that is less than retrieval of the data or group of data from a back storage (e.g., the memory 104 or other memory other than a pre-fetch cache of the block device(s) 106. The different locations, as well as the collected working set data (or metadata) can include different properties (e.g., energy efficiency, cost, write time, read time, capacity, security). The processes for selecting or adaptively pre-fetching the location for any particular piece of data can thus be dynamically predictive of the data associated with any particular set of processes/end-user task/application of any network/user device 120 or on the computer device 100 itself (e.g., as stored in memory or processed by processor 102).

In an aspect, the block device(s) 106 can be configured to generate a prediction about a future I/O request based, at least in part, on the I/O request, the observed I/O behavior, and the updated working set or updated metadata. In response to the updating of the working set or updated metadata, then block device(s) 106 can pre-fetch data adaptively into an updated working set based, at least in part, on the prediction.

Certain or I/O inputs or readers of data can frequently read data at or near the same time while other readers of data can rarely if ever read data at or near the same time. Over time, correlations, relationships, or access patterns can be identified that can facilitate improving the efficiency of data storage via the working sets and working set predictors, and thus, recall by treating I/O operations as predictable events. For example, if a usage pattern is identified that facilitates predicting what data is likely to be read next, then proactive operations can be undertaken to leverage that prediction. In response to the updated working set being adaptively pre-fetched, the one or more block devices are further configured to reduce a number of cache misses with respect to the first working set. The data of the working set can be predicted and cached in response to a trigger or I/O requests, and thus, be readily accessible in order to lower response time and reduce cache misses requiring back storage retrieval as well as more time.

For example, the memory 104 can also include a backing storage (not shown) comprising data of the first working set or the updated working set, wherein the one or more block devices 106 can vary a response time on a cache miss in response to the updated working set being adaptively pre-fetched. The response time on the cache miss, for example, can comprise less time than obtaining, at least in part, the data of the first working set or the updated working set from the back storage.

Figure 2:
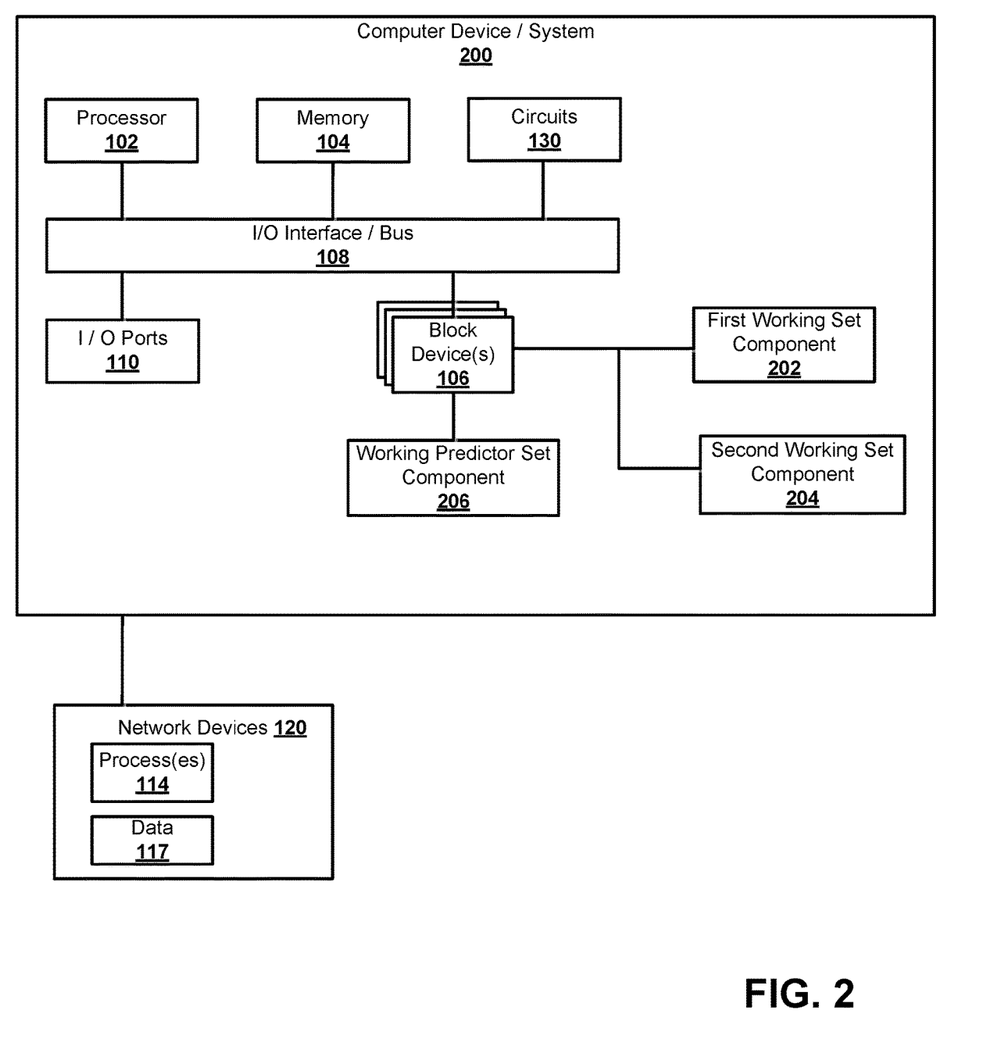
FIG. 2 is an example diagram illustrating another adaptive pre-fetching system or device according to various aspects described.

Referring now to FIG. 2, illustrated is another example of a computer device or system 200. This system 200 is similar to computer device/system 100 with additional components, further including a first working set component 202, a second working set component 204, and a predictor component 206, each of which can be a part of, integrated in or external to, as well as communicatively coupled with one or more of the block devices 106. The first and second working set components 202 and 204 can include sets of data or metadata as discussed above as one or both associated with a working set or an updated working set in response to a prediction. Data, for example, can have different properties upon which decisions that improve the efficiency of the block devices of data storage operation can be made. The properties can include, for example, sources from which data is accessed, destinations to which data is provided, sizes of pieces of data, types of pieces of data received, or other properties. Over time or a time interval, information about the data stored or fetched can be acquired.

For example, information including a frequency with which data from a certain source is read, a frequency with which data of a certain type is read, a frequency with which data of a certain size is read, and other information can be gathered by the block device(s) 106, the first working set component 202, second working set component 204, or the predictor component 206. Other information about the data can also be gathered.

In another example, certain sources of data can frequently provide data at or near the same time while other sources of data can rarely if ever provide data at or near the same time. The data for a particular working set can be ascertained or updated within a predefined time interval. For example, the time interval can be based on a time interval of I/O operations for a particular end-user task application being processed by a network/user device 120. This data or working set can also comprise information including a frequency with which data from a certain source is read, a frequency with which data of a certain type is read, a frequency with which data of a certain size is read, and other information may be gathered, or other information about the data may also be gathered in association with or corresponding to an application 117 generating I/O requests for I/O operations toward one or more end-user tasks or set of processes.

The predictor component 206 can be configured to generate a prediction about a future I/O request based, at least in part, on the I/O request, the observed I/O behavior, the updated metadata, or working set data. As such, the first working set component 202 can be updated or a second working set component 204 can be configured for storage as a block cache for processes of the data in association with end-user task(s) or an application (e.g., set of processes, or group of programs designed for an end-user or device).

In another embodiment, the predictor component 206 can be further configured to capture or determine a first working set predictor comprising unique chunk numbers of the sequence of chunks that are associated with chunks of a block space in one or more block device(s) 106 that are accessed during execution of the I/O operations over a time interval. The sequence or chunk numbers of chunks can be configured based on the working set predictors as the working sets of data for an application. The working set predictor can organize data and be updated based on behavior in order to designate or predict various working sets of data. These predictors can also be based on one or more criteria, such as proximity, use, response time for retrieval, chunk availability, assignment, category, user designation, or the like in a dynamic fashion or adaptively so that each use of the predictors or associated working set can be updated by a particular set of predictors or variables (e.g., an end-user login, user device association with the device 200, application execution/initiation, end-user task being executed, or the like).

The one or more block devices 106 can be further configured to determine a completeness associated with capture of the first working set predictor based on a fixed size set of the unique chunk numbers. The block devices can then capture a second working predictor in response to determining that the first working set predictor has reached a threshold level of completeness. For example, once a first working predictor set or first set of working set predictors are determined at the threshold level (e.g., 50%, less or greater than 50%), then the predictor component 206 can determine a second working predictor set for predicting another second working set of data at component 204, for example, based on the determined predictors.

In another aspect, the block device(s) 106 can determine whether the first working set predictor or the second working set predictor is fully complete based on the fixed size of the set of the unique chunk numbers associated with working predictors of the set, and then record the first working set predictor or the second working set predictor in the one or more block devices 106 in response to the fixed size set being fully completed or full. Fullness can be associated with a predefined capacity or number, for example.

In particular, a working set predictor can be or refer to a fixed size set of unique chunk numbers from a single block space that are accessed during the prosecution of I/O (e.g., I/O port inputs of I/O ports 110, associated processes 114 during an interval in time. In one embodiment, the size of a working set predictor can be 1,000 chunk numbers, or another amount. In other embodiments, other sizes can be employed (e.g. 10,000 chunk numbers, 100,000 chunk numbers). A working set predictor can comprise a successor working set predictor. Thus, a first working set predictor can be a predecessor working set predictor to a second working set predictor, while at the same time be a successor working set predictor to a third working set predictor.

The capture of a successor can begin, for example, upon determination that the capture of its predecessor is 50% complete (i.e., when the predecessor has 500 unique chunk numbers captured). This means that every chunk number that is part of the working set for a particular workload can appear in two "adjacent" working set predictors. When a given working set predictor is full, it can then be recorded by the predictor component 206, or another component, for example.

A working set predictor can be recorded or stored such that it is persistent to the system. The working set predictors for a working set are maintained in memory when the cache is operating for that working set. In one embodiment, the working set predictor is stored alongside the data of which the working set is composed. For example, embodiments described herein can cache data from object stores, from redundant arrays of independent disks (RAID) arrays, from the cloud, or from other data storage systems. Each type of backing data storage can have its own way of storing data and comprise any one of these storages, for example. Example embodiments load into memory the working set predictors (via predictor component 206) for the working sets 202, 204 on a volume at the time that the system mounts the volume through the cache. As the working set is locked onto (because a user is accessing it) or assigned for processing, the system 200 (or 100) can use the working set predictors to predict future accesses and prefetch the data into a cache.

Consider an example embodiment in which a first working set predictor captures which chunks are required to prosecute 1000 I/O operation. In this embodiment, the system starts capturing a second working set predictor (i.e., a successor working set predictor) when the system is 500 operations into capturing the first working set predictor. In this example, the last 500 I/O operations can be satisfied using two chunks, each of those two chunks having unique chunk numbers. Those two chunk numbers are added to the first (e.g. current) working set predictor and the second (e.g. successor) working set predictor. In a like manner, the chunks can be required to satisfy the first 500 I/O operations for the successor working set predictor are also in the preceding (e.g. current, first) working set predictor, as its last 500 I/O operations. When the system or computer device or associated component (e.g., predictor component 206, or working set components 202, 204) uses the working set predictors, it can form a list of chunks for the entire working set and bring them in all at once as a part of the particular working set associated with a particular end-user task, set of processes, or a user application, for example. In another embodiment, the system brings in the chunks in the first few working set predictors, then the next few, and so on.

Figure 3:
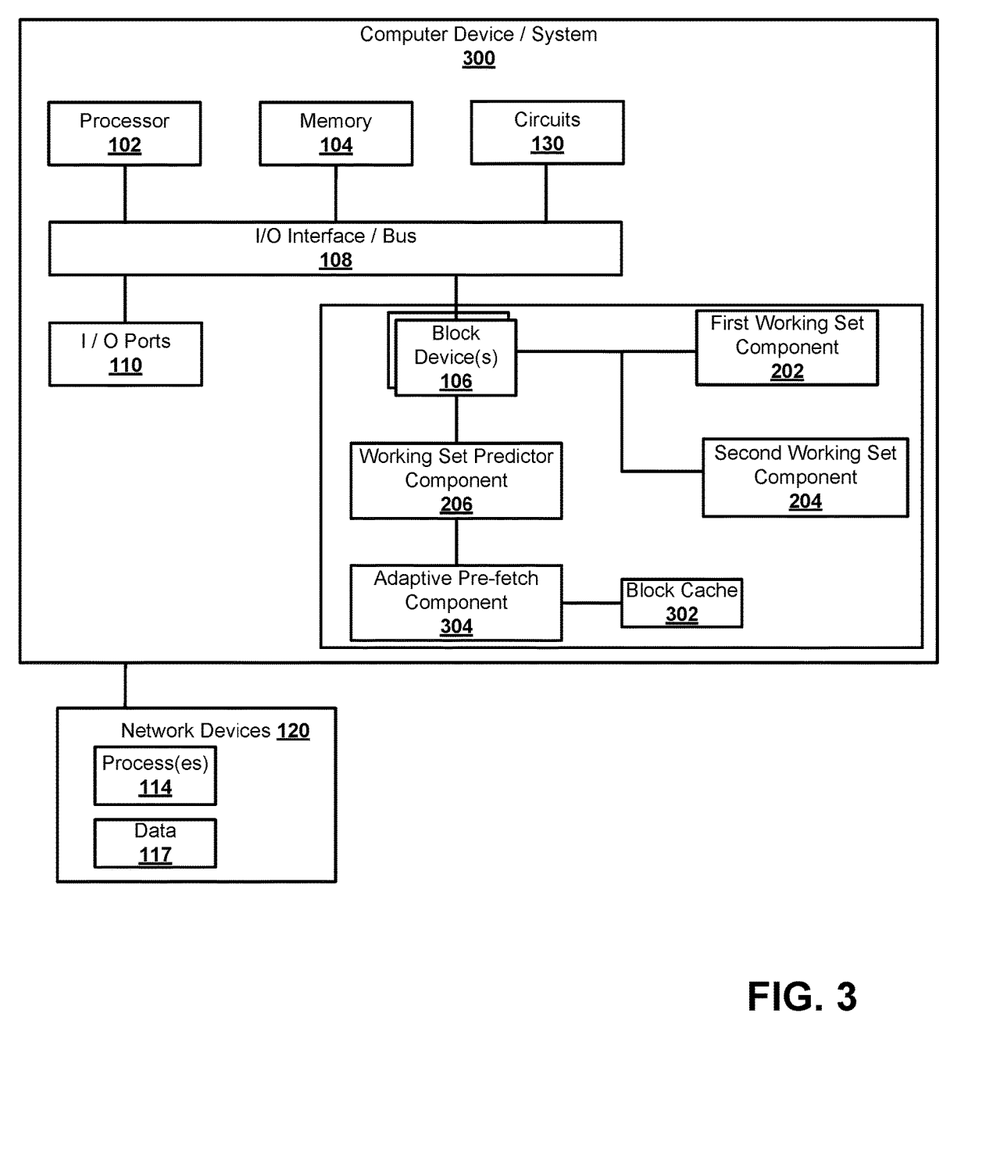
FIG. 3 is an example diagram illustrating another adaptive pre-fetching system or device according to various aspects described.

Referring to FIG. 3, illustrated is another example of a computer device or system 300 in accord with various aspects/embodiments. The system 300 is similar to computer device/system 100 and 200 with additional components, further including one or more blocking caches 302 that are communicatively coupled to or integrated as a part of block device(s) 106. The system 300 includes an adaptive pre-fetch component 304.

The adaptive pre-fetch component 304 of a block device 106 can be configured to relocate data from a backing storage (e.g., the memory 104, other internal/external memory storage, a cloud, server or the like). The adaptive pre-fetch component 304 can thus enhance the performance of data retrieval and storage of the block devices 106 to reduce a number of cache misses based on one or more iterative predictions of a future I/O request based on the I/O request, the observed I/O behavior with an application, end-user device or task, or the updated metadata with respect to a first working set or a second working set of data. The adaptive pre-fetch component 304 retrieves data, provides the data based on a dynamic prediction, and places it into a block cache 302. The adaptive pre-fetch component 304 can reduce cache misses as well as change the response time to be lower than obtaining the data of one or more of the first working set 202 or the second working set 204 from a back or backing storage (e.g., memory 104).

In other aspects, the adaptive pre-fetch component 304 can operate to designate or retrieve the particular data chunks of a block device 106 into the block cache 302 based on the working set predictors of the predictor component 206 for a working set of data as a collection of data (e.g., files, database tables, directory, objects, etc.) before being requested or required by an application in response to a trigger such as a log on by a user or sensing of a user device connection, or other event. The adaptive pre-fetch component 304 can utilize knowledge of the relationships between the data and bocks stored on block devices to retrieve the data from the working sets and predictors that identify these relationships and pre-fetch the data into a block cache 302 for use by an application or end-task, for example.

In an aspect, a working set predictor can have a lifespan. Working set predictor lifespan can be managed with a utility metric. For example, in one embodiment, when a working set predictor is used or survives prediction convergence, the utility metric associated with the working set predictor can be incremented. As such, the working set predictors can be prioritized or ranked. Periodically (e.g. hourly, daily), the utility metric can be divided by a divisor (e.g., two, or another integer of one or greater) using integer arithmetic. When a working set predictor has a utility metric of zero, it can be discarded.

For example, the utility metric can be a cost of use or storage, a frequency of use, level of accuracy from the prediction based on the last usage of the working set of data based on the predictor, a rank or a priority, which can be incremented or decremented at each iteration of usage of working set data and prediction. One or more working set predictors of a working set of predictors can thus be removed or winnowed based on the utility metric. The corresponding data items or descriptors of data can then be removed or winnowed from one or more working sets as well based on the removal of one or more predictors. These operations have the advantaged of reducing storage required, the expense of location them, etc.

Different devices may have different write times, different read times, different overall capacities, different available capacities, different dollar costs, different energy costs, different security levels, and other different properties, which can be associated with the different working sets as predictors governing a priority or ranking of each of the sequence of chunks or chunk numbers of a block device 106, for example. The properties of a device may not be static and could vary as well based on a device state or the different I/O operation requests or inputs within a given time interval of use of a working set of data.

In an example, an application or application end-tasks associated with an end user device or application can operate to request different types of data or data from the block devices that is arranged in different locations with different chunk numbers. This could also change over time. For example, one user device or associated application can request data of a particular sequence of chunk numbers while another user device or associated application (the same or different) request a different sequence. Over time a block device can learn the given data locations associated with each request and pre-fetch the particular sequence of chunk numbers into a cache of the block device managing/controlling the data to make it more readily available, reducing cache misses and response time.

The adaptive pre-fetch component 304 can thus operate to obtain a certain portion (e.g., sector, track, block, associated chunks) of a block device 106 being accessed and may predictively pre-fetch the portion just in case it may be needed based on the working set. Example apparatus and methods may go beyond this file read-ahead or spatial pre-fetch and may detect that when a certain read action or other memory operation occurs that other read actions that will acquire data outside the currently accessed file or space are likely to follow and may predictively pre-fetch the additional information into the block cache 302 to be buffered or temporarily located threat to be retrieved efficiently.

As stated above, a working set predictor can have a particular lifespan or time interval for operation (e.g., a duration of I/O operations, input requests, application/end-task execution, or a predefined interval). Working set predictor lifespan can be managed with a utility metric. For example, in one embodiment, every time a working set predictor is used or survives prediction convergence, the utility metric associated with the working set predictor can be incremented. Periodically (e.g. hourly, daily), the utility metric can be divided using integer arithmetic. When a working set predictor has a utility metric of zero, it can be discarded.

A working set predictor can become bloated. Working set predictors captured while multiple workloads are running can predict many more chunks accessed than each of the multiple workloads, run independently, would access.

Example embodiments include the predictor component 206, or other thereat being configured to further compute a degree of bloat in a working set predictor. A bloated working set predictor can be dropped from the prediction based, at least in part, on a ranking or priority (e.g., cost or other metric/policy/criteria measure described herein) of using the prediction. Thus, example embodiments facilitate convergence on a smaller set of working set predictors, from single workload observations (if single workload observations exist), or will drive the system out of prefetch (if single workload observations don't exist). Bloat can be defined by such policy or metric as a function of cost, proximity, usage frequency, as well as other criteria such a threshold level of accuracy for an accessed chunk and a threshold level of fullness based on a threshold amount or number for ranking or prioritizing the working set predictors.

Figure 4:
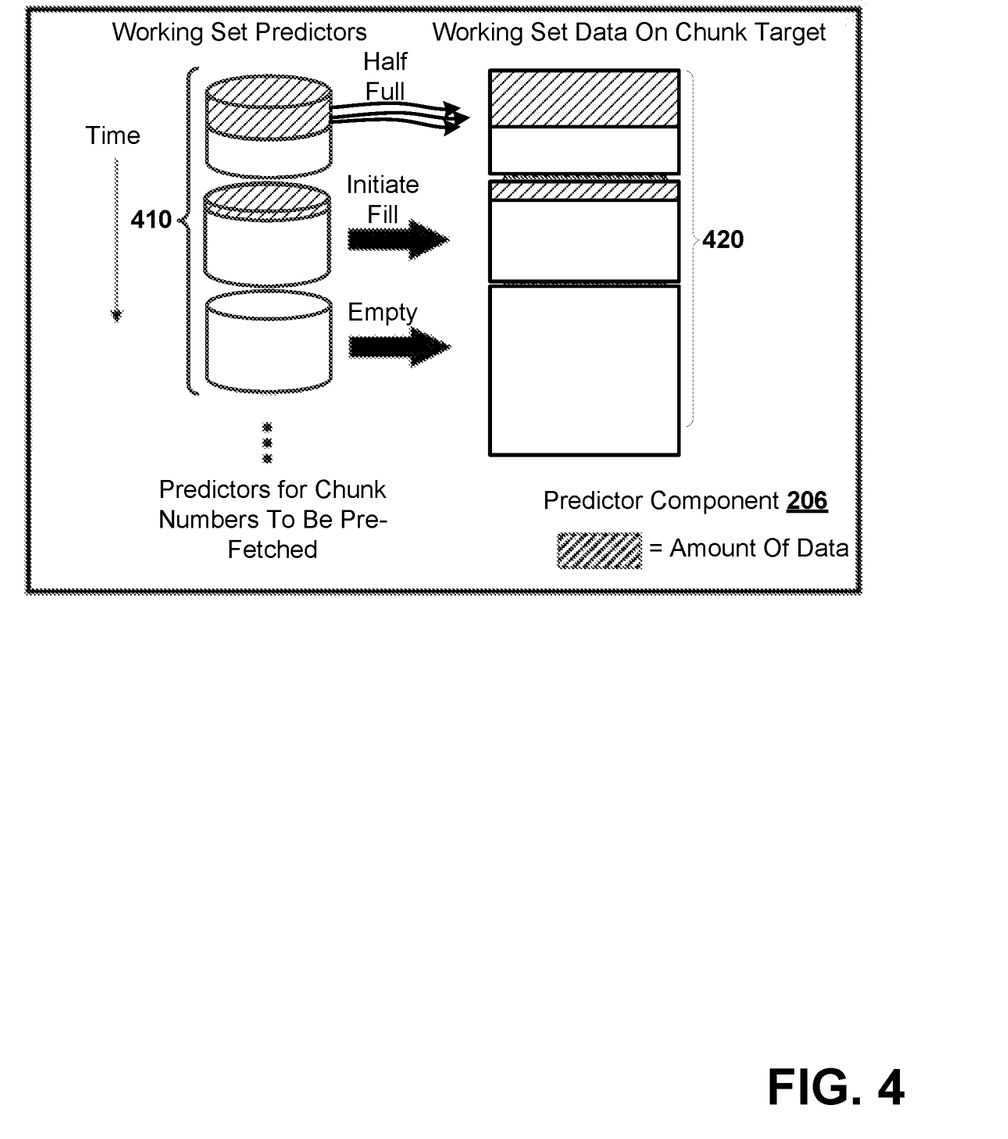
FIG. 4 is an example diagram illustrating a predictor component for adaptive pre-fetch according to various aspects described.

Referring to FIG. 4, illustrative is a predictor component 206 in accord with various aspects or embodiments. The predictor component 206 comprises various sets of working set predictors 410 that have been captured or determined that point to or predict various chunk numbers or sequences of chunks with working sets of data 420. The sequences of chunks can be based on any sequence of data usage relative to an end-task or user application of a user device based on various I/O operations or requests. A sequence of chunks is not necessarily consecutive in sequence, could be interspersed throughout one or more chunks, be based on a proximity of available resources, memory, or data that can be pre-fetched based on a priority or metric to decrease response time and cache misses requiring back storage data.

Having captured a plurality of working set predictors, embodiments described herein generate a prediction, based on the plurality of working set predictors, to lock on to the workload being prosecuted. The prediction is a set of relevant working set predictors. Initially, the prediction is the set of all working set predictors that contain the accessed chunk number. When a cache miss occurs, embodiments of a component can immediately fetch the required chunk from backing storage (e.g., as a cache miss).

For every chunk access, embodiments improve the prediction, including for cache hits and cache misses. In one embodiment, the prediction is improved by winnowing the prediction. Winnowing the prediction includes removing irrelevant working set predictors. In one embodiment, an irrelevant working set predictor is a working set predictor that does not contain the accessed chunk number, which can be removed from the set of working set predictors 410, for example.

The prediction is also improved by selectively including a working set predictor's successor. In one embodiment, for every working set predictor remaining in the prediction, the successor working set is included if and only if it also predicts the accessed chunk. Thus, the shaded set can comprise a number of predictors for a given working set predictor that has been captured (as shaded or cross-hatched 410. The data from the first half of working set predictor(s) 410 at the top-most working set predictors is half full, in which the finite set can for a given end-task or application can be a threshold by which to begin initiating capture of another set of predictors (e.g., the middle set of predictors 410) that can be for the same or different end-user task or application based on related past I/O operations. The same or different predictors of the first set can be included into the second (middle), while some that have not been accurate or predicted the data to be requested with accuracy can be removed. In this manner, the prediction can be iterative and adaptively improved.

The prediction can be further improved by managing predictions that are empty sets. In one embodiment, if the prediction is an empty set, example embodiments form a new prediction. In this case, a new prediction is the set of all working set predictors that contain the accessed chunk number or number(s) as depicted by the pointer arrows to particular chunks of the working sets of data 410.

Thus, if a workload or workloads currently being processed have been seen previously by the system (e.g., 100-300), the prediction will converge (i.e., lock on) to the working sets 420 for those workloads based on their relationships to any one given task, application or end-user task of I/O operations. Once the prediction has converged to a threshold level (of accuracy), example embodiments or component (e.g., adaptive pre-fetch component 304) can pre-fetch all the chunks in the prediction that are not already in the cache 302.

The threshold level can be defined by a policy, or by a metric. For example, in one embodiment, the threshold level can be defined as a function of cost to fetch a chunk from backing storage. In another embodiment, other policies or metrics can be employed.

A prediction based on a working set of predictors can be a function of a size of a piece of data (e.g., a first chunk or group of chunk numbers/sequence of chunks), the type of data being received, a likely owner of the data, or other descriptive information. Predictions can be made from metadata associated with data being processed. For example, information about a file size can be available for a file being read, or a destination. In this case the prediction is based on descriptive metadata, for example. Predictions can be based on descriptive metadata and history. For example, a certain file or certain type of file being read from a certain device or certain type of device can have a history of requiring a certain number of corrections. Predictions can concern even more sophisticated issues including spatial, temporal, or other relationships between the data and other data that has been processed or that is likely to be processed by the system or device 100-300. The spatial, temporal, or other relationships can be used to control pre-fetching data, relocating data that has been stored, or other actions for adaptively/dynamically pre-fetching data for an application or end user device. For example, data that is read together with a certain frequency can be moved to a single device or can be relocated on a device so that it can be read more efficiently in a block cache from the backing storage upon receiving I/O inputs or requests. Additionally, data that is rarely read together can be distributed to different devices or relocated on a device to make room for other data that can benefit from a different placement.

In one embodiment, a probabilistic model (e.g., Markov chain, Bayesian filtering, fuzzy logic, neural logic, or other artificial intelligence scheme) can be used to make different predictions. Since the predictions are just that, predictions, example methods and apparatus can rank the predictions and allocate computing resources based on the rank. For example, a group of predictions can be identified and then parallel processes can be spawned to perform processing associated with each of the predictions. By way of illustration, information learned from prior observations can indicate that when a certain piece of data is read that other pieces of data can be read as a part of the chunk of the block device.

In some circumstances, when a workload begins or ends is unknown, or difficult to know. Workloads can, for example, run in different orders. Workloads can also, for example, run in isolation or can run overlapping with other workloads. Example embodiments accommodate workload order. In one embodiment, overlapping workloads whose working set predictors are originally captured in isolation will simply cause the prediction to converge to a larger set of working set predictors. Workloads that overlap during working set predictor capture can result in bloat, which example embodiments accommodate.

Example embodiments thus improve the performance of a computer or computer-related technology by decreasing the frequency of cache misses, which reduces the frequency of calls to slower, non-cache storage.

While the methods or process flows are illustrated and described herein as a series of acts or events, it will be appreciated that the illustrated ordering of such acts or events are not to be interpreted in a limiting sense. For example, some acts can occur in different orders/concurrently with other acts or events apart from those illustrated/described herein. In addition, not all illustrated acts could be required to implement one or more aspects or embodiments of the description herein. Further, one or more of the acts depicted herein may be carried out in one or more separate acts or phases.

Figure 5:
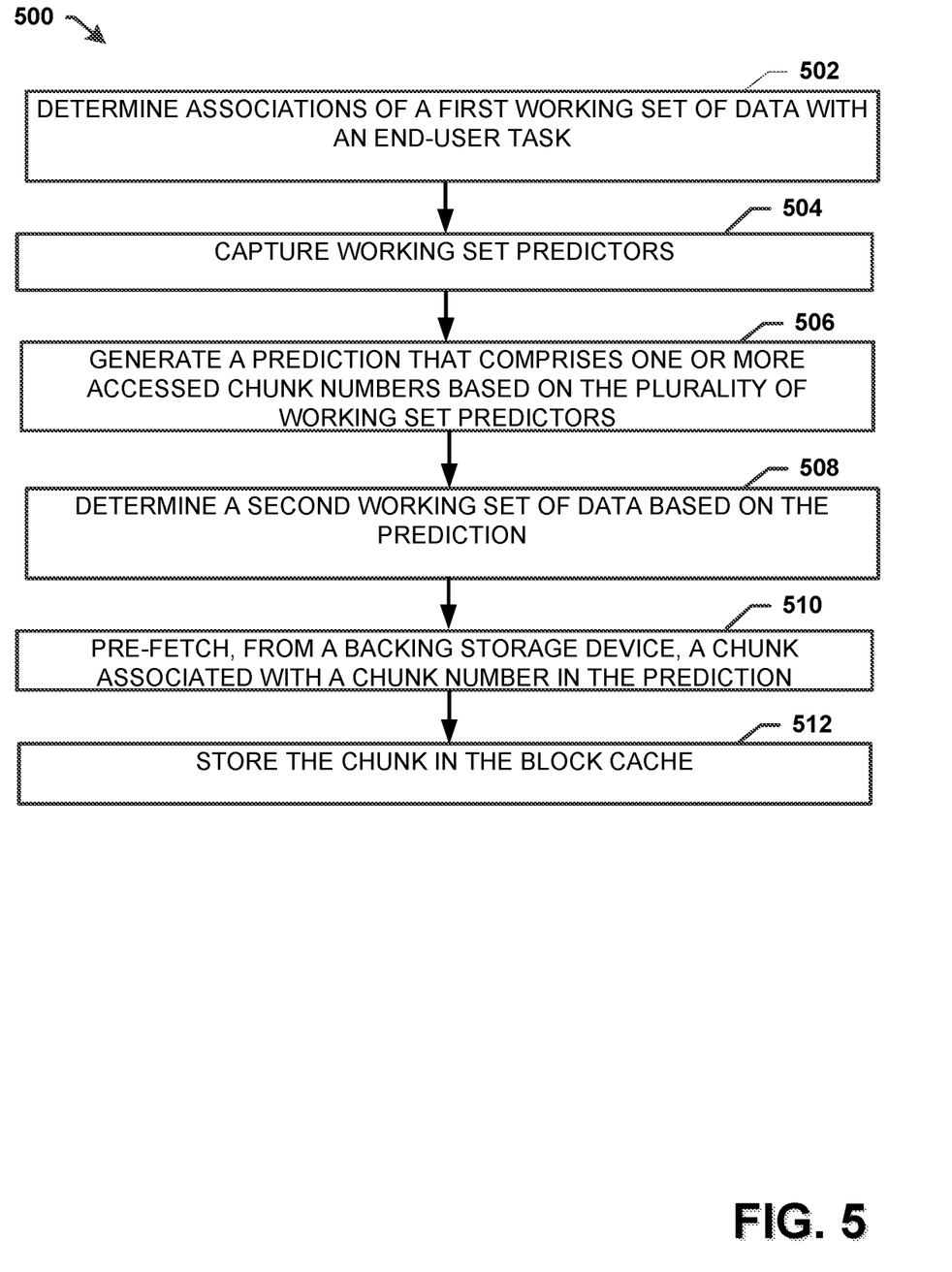
FIG. 5 is an example process flow for adaptive pre-fetching of devices in accordance with various aspects described.

Referring to FIG. 5, illustrated is an example process flow 500 for adaptively pre-fetching to reduce cache misses and response time for an application or requests for data. The process flow can include one or more acts that can be performed by a processor or other component as discussed herein, as well as a non-transitory computer-readable storage device storing computer-executable instructions that when executed by a computer, process or described component cause execution of operations of the process flow 500.

At 502, the process flow 500 initiates with determining, via a block device comprising a block cache based on a block space of a sequence of chunks, associations of a first working set of data with an end-user task.

At 504, the process flow comprises capturing a plurality of working set predictors comprising a fixed size set of unique chunk numbers associated with the sequence of chunks from the block space that are accessed during prosecution of the end-user task.

At 506, a prediction is generated via a blocking device or a predictor component 206 that comprises an accessed chunk number based on the plurality of working set predictors.

At 508, a second working set of data is determined based on the prediction.

At 510, prefetching, from a backing storage device, a chunk associated with a chunk number in the prediction is pre-fetched from a backing storage device or memory 104 based on the prediction and the second working set of data.

At 512, the chunk is stored in the block cache of the block device to be provided in response to an I/O operation from an application or end-user task.

In an embodiment, a first working set predictor of the plurality of working set predictors can be captured based on a time interval of input/output (I/O) operations of the end-user task. In response to determining that the first working set predictor satisfies a threshold level of completeness, a second working set predictor that is concurrent to or overlapping the capturing of the first working set predictor can be captured. The generation of the prediction can be in response to a threshold number of working set predictors being captured that is less than a complete set of working set predictors.

In an aspect, the predictors of a first working set of predictors (first working set predictors) can overlap (at least in part) with a second working set of predictors. For example, an end of a working set of predictors can overlap with a beginning of another working set of predictors that is a successor to the first working set. This can enable the cache pre-fetch process to execute in a smooth continuity with less interruptions across multiple predictors or working sets of predictors that can represent a large working set of data (data items, data descriptors, or the like), for example.

In response to a determination that the chunk has been accessed, the prediction can be winnowed or refined by removing a working set predictor of the plurality of working set predictors that comprises a different chunk number than the chunk number associated with the chunk that has been accessed. Further, a determination can be made as to whether the prediction comprises an empty set. In response to the prediction comprising the empty set, generating a different prediction, where the different prediction comprises another plurality of working set predictors that comprise the chunk number associated with the chunk that has been accessed.

One of ordinary skill in the art can appreciate that the various non-limiting embodiments of the shared systems and methods described herein can be implemented in connection with any computer or other client or server device, which can be deployed as part of a computer network or in a distributed computing environment, and can be connected to any kind of data store. In this regard, the various non-limiting embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the shared shopping mechanisms as described for various non-limiting embodiments of the subject disclosure.

Figure 6:
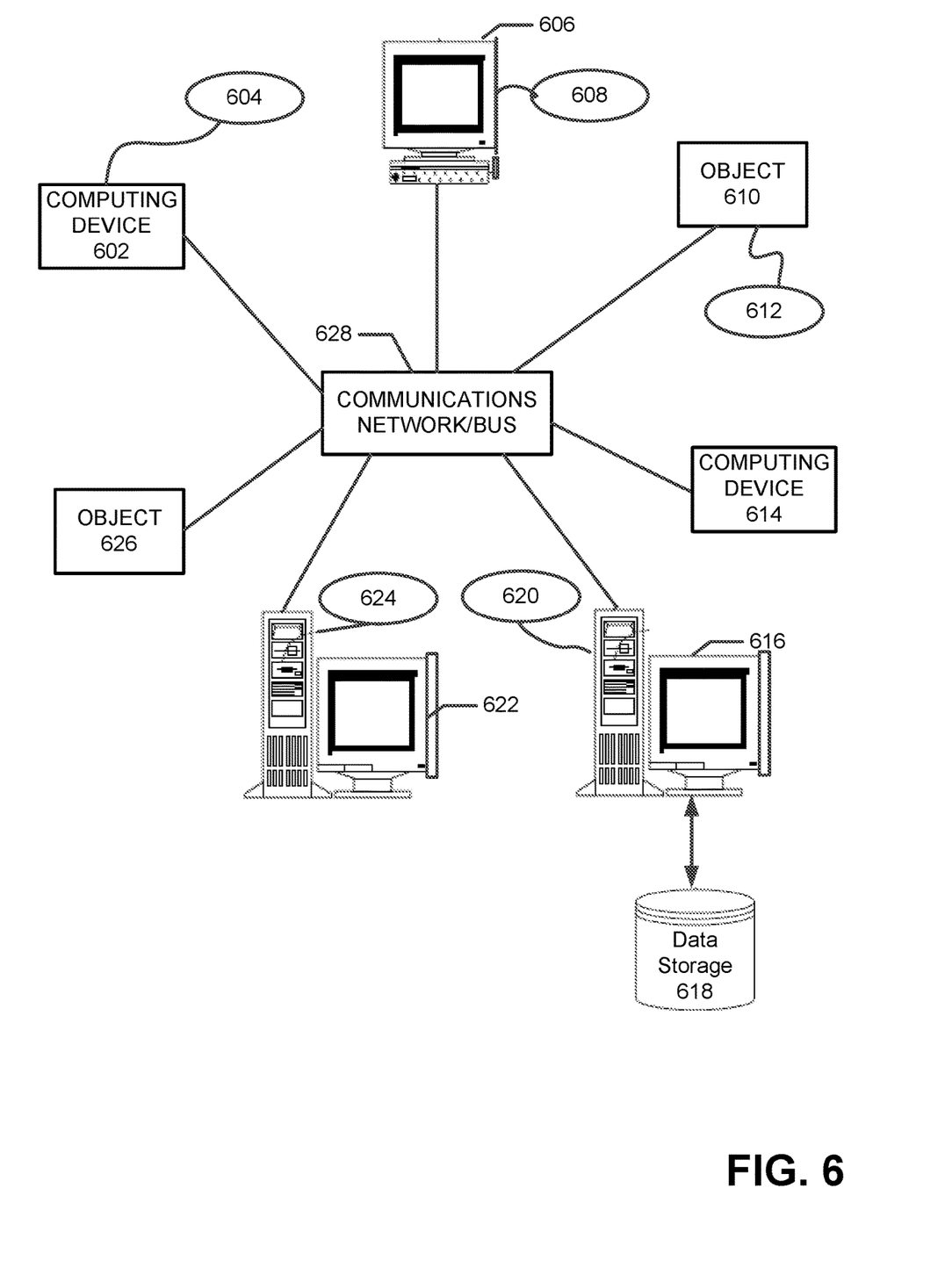
FIG. 6 is a block diagram representing exemplary non-limiting networked environments in which various non-limiting embodiments described herein can be implemented.

FIG. 6 provides a schematic diagram of an exemplary networked or distributed computing environment that can implement one or more components, devices or systems for adaptive pre-fetching as described herein. The distributed computing environment comprises computing objects 610, 626, etc. and computing objects or devices 602, 606, 610, 614, etc., which may include programs, methods, data stores, programmable logic, etc., as represented by applications 604, 608, 612, 620, 624. It can be appreciated that computing objects 612, 626, etc. and computing objects or devices 602, 606, 610, 614, etc. may comprise different devices, such as personal digital assistants (PDAs), audio/video devices, mobile phones, MP3 players, personal computers, laptops, etc.

Each computing object 610, 612, etc. and computing objects or devices 620, 622, 624, 626, etc. can communicate with one or more other computing objects 610, 612, etc. and computing objects or devices 620, 622, 624, 626, etc. by way of the communications network 628, either directly or indirectly. Even though illustrated as a single element in FIG. 6, communications network 628 may comprise other computing objects and computing devices that provide services to the system of FIG. 6, and/or may represent multiple interconnected networks, which are not shown. Each computing object 610, 626, etc. or computing object or device 620, 622, 624, 626, etc. can also contain an application, such as applications 604, 608, 612, 620, 624, that might make use of an API, or other object, software, firmware and/or hardware, suitable for communication with or implementation of the shared shopping systems provided in accordance with various non-limiting embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the shared shopping systems as described in various non-limiting embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In client/server architecture, particularly a networked system, a client is usually a computer that accesses shared network resources provided by another computer, e.g., a server. In the illustration of FIG. 6, as a non-limiting example, computing objects or devices 620, 622, 624, 626, etc. can be thought of as clients and computing objects 610, 626, etc. can be thought of as servers where computing objects 610, 626, etc., acting as servers provide data services, such as receiving data from client computing objects or devices 620, 622, 624, 626, etc., storing of data, processing of data, transmitting data to client computing objects or devices 620, 622, 624, 626, 628, etc., although any computer can be considered a client, a server, or both, depending on the circumstances. Any of these computing devices may be processing data, or requesting services or tasks that may implicate the shared shopping techniques as described herein for one or more non-limiting embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 640 or bus is the Internet, for example, the computing objects 610, 626, etc. can be Web servers with which other computing objects or devices 620, 622, 624, 626, etc. communicate via any of a number of known protocols, such as the hypertext transfer protocol (HTTP). Computing objects 610, 612, etc. acting as servers may also serve as clients, e.g., computing objects or devices 620, 622, 624, 626, etc., as may be characteristic of a distributed computing environment.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components or circuits that provide the described functionality. In some embodiments, the circuitry can be implemented in, or functions associated with the circuitry can be implemented by, one or more software or firmware modules. In some embodiments, circuitry can include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Other examples of the various aspects/embodiments herein can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

A First example can include a non-tangible computer storage device with a method of operations comprising: capturing a first working set predictor, where a working set predictor is a fixed size set of unique chunk numbers associated with chunks from a block space that are accessed during prosecution of input/output (I/O) operations over a time interval; upon determining that the first working set predictor has reached a threshold level of completeness: capturing a second working set predictor; upon determining that the first working set predictor or the second working set predictor is full: recording the first working set predictor or the second working set predictor; upon determining that a threshold number of working set predictors have been captured: generating a prediction, where the prediction is a set of working set predictors that contain an accessed chunk number; upon determining that the prediction has converged to a threshold level of convergence: upon determining that a chunk associated with a chunk number is not stored in a cache: prefetching, from a backing storage device, a chunk associated with a chunk number in the prediction; and storing the chunk in the cache.

A second example can include the subject matter of the first example, further comprising: upon determining that a chunk has been accessed: winnowing the prediction by removing a working set predictor that does not contain the chunk number associated with the chunk that has been accessed.

A third example can include the subject matter of any one or more of the first or second examples, further comprising: upon determining that a prediction is an empty set: generating a new prediction, where the new prediction includes a set of working set predictors that contain the chunk number associated with the chunk that has been accessed.

A fourth example can include the subject matter of any one or more of the first through third examples, where a working set predictor has a lifespan, the method further comprising: upon determining that a working set predictor has reached the end of its lifespan: discarding the working set predictor.

A fifth example can include the subject matter of any one or more of the first through third examples, further comprising: upon determining that a working set predictor has a threshold level of bloat: removing the working set predictor from the prediction based, at least in part, on a cost to use the prediction.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations can include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

The following includes definitions of selected terms employed herein. The definitions include various examples and/or forms of components that fall within the scope of a term and that can be used for implementation. The examples are not intended to be limiting. Both singular and plural forms of terms can be within the definitions.

"Computer-readable storage medium" or "computer-readable storage device" as used herein, refers to a non-transitory medium that stores instructions and/or data. "Computer-readable storage medium" or "computer-readable storage device" does not refer to propagated signals, per se. A computer-readable medium can take forms, including, but not limited to, non-volatile media, and volatile media. Non-volatile media can include, for example, optical disks, magnetic disks, and other disks. Volatile media can include, for example, semiconductor memories, dynamic memory, and other memories. Common forms of a computer-readable medium or computer-readable storage device can include, but are not limited to, a floppy disk, a flexible disk, a hard disk, a magnetic tape, a solid state device (SSD) a shingled magnetic recording (SMR) device, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store can be, for example, a database, a table, a file, a data structure (e.g. a list, a queue, a heap, a tree) a memory, a register, or other repository. In different examples, a data store can reside in one logical and/or physical entity and/or can be distributed between two or more logical and/or physical entities.

An "operable connection", or a connection by which entities are "operably connected", is one in which signals, physical communications, or logical communications can be sent or received. An operable connection can include a physical interface, an electrical interface, or a data interface. An operable connection can include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions can be embodied in various forms including routines, algorithms, modules, methods, threads, or programs including separate applications or code from dynamically linked libraries.

"User", as used herein, includes but is not limited to one or more persons, software, logics, applications, processors, circuits, computers or other devices, or combinations of these.

While example methods, apparatus, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus for adaptive pre-fetching, comprising:
    a processor;
    one or more block devices comprising a block space comprising a sequence of chunks;
    a memory that stores metadata associated with a first working set being processed by the processor for the one or more block devices, wherein the metadata comprises one or more of: an access pattern, a usage trend, a relationship, or a prediction, related to the first working set being processed by the apparatus based on input/output (I/O) operations of an end-user task;
    an interface that communicatively couples the processor, the memory, and the one or more block devices;
    wherein the one or more block devices are configured to:
        process an I/O request for the I/O operations related to the first working set being processed;
        update the metadata based on observed I/O behavior with the one or more block devices;
        generate a prediction about a future I/O request based, at least in part, on the I/O request, the observed I/O behavior, and the updated metadata;
        pre-fetch data adaptively into a second working set based, at least in part, on the prediction; and
        remove a working set predictor of a plurality of working set predictors for the second working set based on an accuracy of the prediction of the working set predictor associated with an accessed chunk.

2. The apparatus of claim 1, wherein in response to the second working set being adaptively pre-fetched, the one or more block devices are further configured to reduce a number of cache misses with respect to the first working set.

3. The apparatus of claim 1, further comprising a backing storage comprising data of the first working set or the second working set, wherein the one or more block devices are further configured to vary a response time on a cache miss in response to the second working set being adaptively pre-fetched, and wherein the response time on the cache miss comprises less time than obtaining, at least in part, the data of the first working set or the second working set from the backing storage.

4. The apparatus of claim 1, wherein the one or more block devices are further configured to capture a first working set predictor comprising unique chunk numbers of the sequence of chunks that are associated with chunks of the block space that are accessed during execution of the I/O operations over a time interval.

5. The apparatus of claim 4, wherein the one or more block devices are further configured to:
    determine a completeness associated with capture of the first working set predictor based on a fixed size set of the unique chunk numbers; and
    capture a second working set predictor in response to determining that the first working set predictor has reached a threshold level of completeness.

6. The apparatus of claim 5, wherein the one or more block devices are further configured to determine whether the first working set predictor or the second working set predictor is fully complete based on the fixed size of the set of the unique chunk numbers, and recording the first working set predictor or the second working set predictor in the one or more block devices in response to the fixed size set being fully complete.

7. The apparatus of claim 1, wherein the one or more block devices are further configured to:
    determine whether the prediction has converted to a threshold level of convergence for at least one of: a first working set predictor or a second working set predictor; and
    in response to the prediction being converted to a threshold level of convergence and a chunk associated with a chunk number in the prediction not being stored in a cache, prefetching the chunk associated with the chunk number in the prediction from a backing storage device to store the chunk in the cache.

8. The apparatus of claim 1, wherein the one or more block devices are further configured to capture the plurality of working set predictors for the second working set and generate the prediction for the second working set based on the plurality of working set predictors.

9. The apparatus of claim 1, wherein the one or more block devices are further configured to:
    winnow the prediction by removing the working set predictor of the plurality of working set predictors for the second working set that does not comprise a chunk number associated with a chunk being accessed for the input/output (I/O) operations of the end-user task.

10. The apparatus of claim 1, wherein the one or more block devices are further configured to:
    determine whether the working set predictor comprises a threshold level of bloat, and remove the working set predictor from the prediction based, at least in part, on a cost to use the prediction in response to satisfying the threshold level of bloat.

11. A non-transitory computer-readable storage device storing computer-executable instructions that when executed by a computer cause the computer to perform a method for reducing cache miss frequency, the method comprising:
    determining, via a block device comprising a block cache based on a block space of a sequence of chunks, associations of a first working set of data with an end-user task;
    capturing a plurality of working set predictors comprising a fixed size set of unique chunk numbers associated with the sequence of chunks from the block space that are accessed during processing of the end-user task;
    generating a prediction that comprises an accessed chunk number based on the plurality of working set predictors;
    determining a second working set of data based on the prediction;

prefetching, from a backing storage device, a chunk associated with a chunk number in the prediction; and
storing the chunk in the block cache.

12. The non-transitory computer-readable storage device of claim 11, the method further comprising:
reducing a number of cache misses related to the first working set of data and the end-user task, or reducing a response time of a cache miss, by adaptively prefetching the chunk from the second working set of data, wherein the response time of the cache miss comprises less time than obtaining the chunk from the backing storage device.

13. The non-transitory computer-readable storage device of claim 11, the method further comprising:
capturing a first working set predictor of the plurality of working set predictors based on a time interval of input/output (I/O) operations of the end-user task; and
in response to determining that the first working set predictor satisfies a threshold level of completeness, capturing a second working set predictor that is concurrent to or overlapping the capturing of the first working set predictor.

14. The non-transitory computer-readable storage device of claim 11, wherein the generating the prediction is in response to a threshold number of working set predictors being captured that is less than a complete set of working set predictors.

15. The non-transitory computer-readable storage device of claim 11, the method further comprising:
in response to a determination that the chunk has been accessed, winnowing the prediction by removing a working set predictor of the plurality of working set predictors that comprises a different chunk number than the chunk number associated with the chunk that has been accessed.

16. The non-transitory computer-readable storage device of claim 15, the method further comprising:
determining whether the prediction comprises an empty set; and
in response to the prediction comprising the empty set, generating a different prediction, where the different prediction comprises another plurality of working set predictors that comprise the chunk number associated with the chunk that has been accessed.

17. A system for an adaptive pre-fetch that reduces a cache miss frequency comprising:
one or more processors;
a plurality of block devices comprising block caches configured as block spaces comprising a sequence of chunks;
a memory comprising metadata related to a first working set being processed by the processor and comprising associations of the plurality of block devices with input/output (I/O) operations of an end-user task, wherein the metadata comprises one or more of: an access pattern, a usage trend, a relationship, or a prediction, related to the first working set;
an interface that communicatively couples the one or more processors, the memory, and the plurality of block devices;
wherein the plurality of block devices comprise one or more processing components configured to:
process an I/O request for the I/O operations related to the first working set being processed;
generate a plurality of working set predictors based on the first working set and I/O behavior with the plurality of block devices and the metadata;
generate a prediction about a future I/O request based, at least in part, on the I/O request and the observed I/O behavior;
pre-fetch a chunk of the sequence of chunks adaptively into a second working set based, at least in part, on the prediction and a change in the prediction; and
determine whether the prediction has converted to a threshold level of convergence for at least one of: a first working set of predictors or a second working set of predictors; and
in response to the prediction being converted to the threshold level of convergence and the chunk associated with a chunk number in the prediction not being stored in a cache, prefetching the chunk associated with the chunk number in the prediction from a backing storage device to store the chunk in the cache.

18. The system of claim 17, wherein the plurality of block devices are further configured to:
capture the second working set of predictors of the plurality of working set predictors in response to the first working set of predictors satisfying a threshold level of completeness, wherein the second working set of predictors overlap in part with the first working set of predictors;
record the first working set of predictors or the second working set of predictors in response to the first working set of predictors or the second working set of predictors being full;
pre-fetch, from the backing storage device, the chunk associated with the chunk number, or the chunk number, in the prediction in response to determining that the prediction satisfies a threshold level of convergence; and
store the chunk in at least one blocking cache.

19. The system of claim 18, wherein the plurality of block devices are further configured to:
remove one or more predictors from the first working set of predictors or the second working set of predictors based on a utility metric; and
remove one or more data items or descriptors from the first working or the second working set based on removal of the one or more predictors.

* * * * *